(12) United States Patent
Roberts et al.

(10) Patent No.: US 6,556,144 B1
(45) Date of Patent: Apr. 29, 2003

(54) METHOD AND APPARATUS FOR DATA COMMUNICATION WITH AN UNDERGROUND INSTRUMENT PACKAGE

(75) Inventors: George Roberts, Georgetown, TX (US); Edward Fraser, Cupertino, CA (US); Fred Earnest, Pflugerville, TX (US)

(73) Assignee: Reuter-Stokes, Inc. (General Electric Company), Schenectady, NY (US)

( * ) Notice: Subject to any disclaimer, the term of this patent is extended or adjusted under 35 U.S.C. 154(b) by 0 days.

(21) Appl. No.: 09/544,969

(22) Filed: Apr. 7, 2000

Related U.S. Application Data
(60) Provisional application No. 60/128,374, filed on Apr. 8, 1999.

(51) Int. Cl.[7] ................................................ G01V 3/00
(52) U.S. Cl. ............................. 340/854.1; 340/855.8
(58) Field of Search .................. 340/854.1, 854.4, 340/855.4, 855.8

(56) References Cited

U.S. PATENT DOCUMENTS

| | | | | |
|---|---|---|---|---|
| 4,363,137 A | | 12/1982 | Salisbury | 250/262 |
| 4,739,325 A | | 4/1988 | MacLeod | 340/854 |
| 4,821,035 A | * | 4/1989 | Hanson et al. | 340/856 |
| 4,864,293 A | * | 9/1989 | Chau | 340/856 |
| 5,091,725 A | | 2/1992 | Gard | 340/854 |
| 5,467,083 A | | 11/1995 | McDonald et al. | 340/854.6 |
| 5,883,516 A | * | 3/1999 | Van Steenwyk et al. | 324/366 |

FOREIGN PATENT DOCUMENTS

| | | | | |
|---|---|---|---|---|
| WO | WO 98/23849 | 6/1998 | | E21B/47/12 |
| WO | WO 99/37044 | 7/1999 | | H04B/13/02 |

OTHER PUBLICATIONS

"Electric Drill Stem Telemetry," J. Bhagwan and F.N. Trofimenkoff, IEEE Transaction on Geo Science and Remote Sensing, VOL> GE–20, No. 2, Apr. 1982 p. 193–194.

* cited by examiner

*Primary Examiner*—Timothy Edwards
(74) *Attorney, Agent, or Firm*—Nixon & Vanderhye P.C.

(57) ABSTRACT

A data communication system is provided for communicating with an underground instrument package positioned on a drilling apparatus. The drilling apparatus has an insulated section between first and second conductive sections. The system includes a power supply connected to the first conductive section of the drilling apparatus and to the ground. A receiver measures current flowing through the power supply. An electrical path is provided between the first and second conductive sections of the drilling apparatus. A switch provided in the electrical path opens and closes the electrical path in response to the data generated by the instrument package.

30 Claims, 4 Drawing Sheets

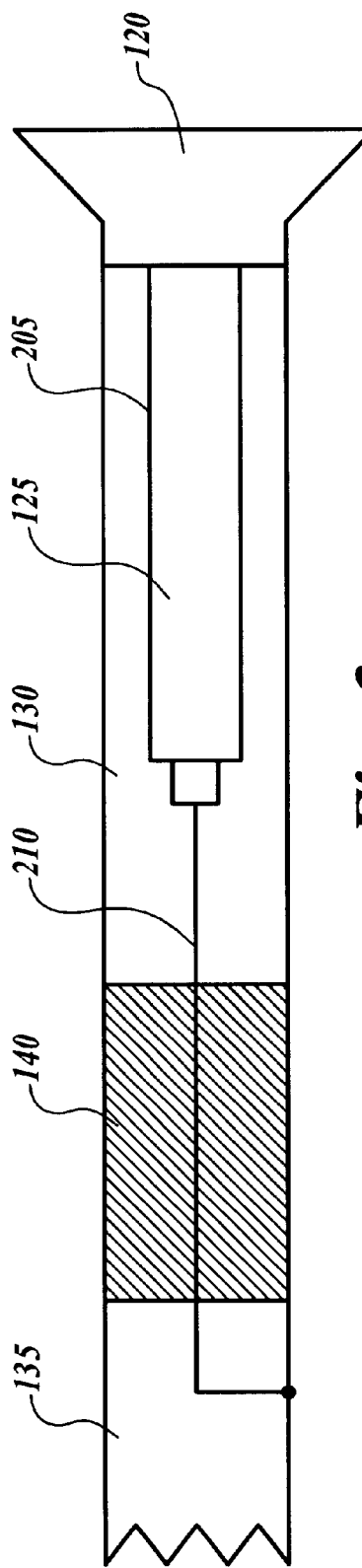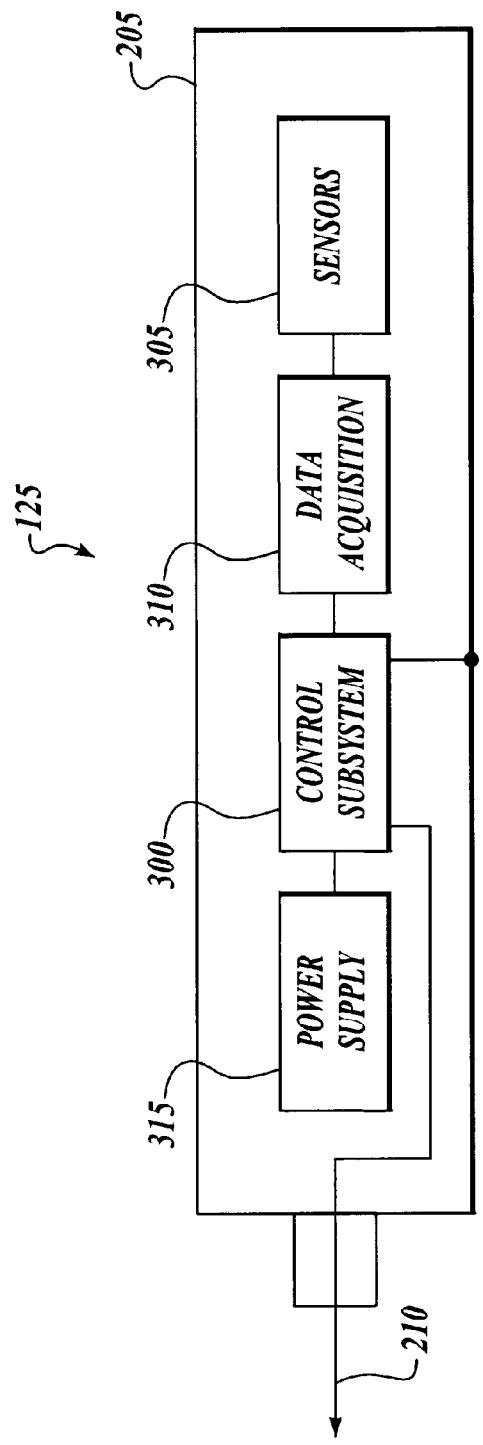

METHOD AND APPARATUS FOR DATA COMMUNICATION WITH AN UNDERGROUND INSTRUMENT PACKAGE

CROSS-REFERENCE TO RELATED APPLICATION

This application claims the benefit of provisional application No. 60/128,374, filed Apr. 8, 1999.

BACKGROUND OF THE INVENTION

1. Field Of The Invention

The invention relates generally to transmitting and receiving data of underground activity, and more specifically, data communication between a surface transmitter/receiver and underground electronic instruments such as sensors for detecting the position and status of underground drilling equipment.

In a down-hole well bore, a drill string may include an instrument package near the drill bit end to monitor the position and condition of the underground portion of the drilling equipment during operation. Data generated by the instrument package is transmitted to the surface for use by the operator.

2. Description of the Prior Art

There are several known ways to transmit data from an underground device. In a so-called wire-line configuration, data from the instrument package is transmitted through an electrical wire that runs from the instrument package through the drill string to a receiver on the surface. The wire may be a single conductor that uses the drill string as a return path or a two-conductor wire, such as a coaxial cable. The wire may be used to provide power to the instrument package from a power supply on the surface. Typically, a data rate of at least about 1200 bps (bits per second) may be achieved.

Among other disadvantages, however, the wire-line configuration is particularly vulnerable to failure of the electrical wire connection. The wire must be carefully handled during installation and operation of the drilling equipment to prevent the wire from becoming entangled or severed. Moreover, the wire may be subject to damage due to torque, vibration, repeated bending and twisting, and other mechanical forces associated with the operation of the drilling equipment. In addition, the wire-line configuration may require rotary electrical connections, which tend to reduce reliability.

Another conventional method, mud pulse telemetry, relies on modulation of the mud flow through the drilling equipment. During drilling operations, mud, or drilling fluid, is circulated through the well-bore. A mechanism positioned near the end of the drill string modulates the mud flow by opening and closing an aperture. The modulation in the mud flow is detected by a mechanical sensor at the surface.

Since mud pulse telemetry does not require a wired connection between the instrument package and the receiver through the drill string, it avoids many of the problems associated with the wire-line configuration. However, mud pulse telemetry has a data rate of only 1–2 bps. Moreover, the technique requires mechanically moving parts, which reduces reliability.

Another conventional method uses a wireless or electromagnetic (EM) configuration in which data from the downhole instrument package is transmitted as electromagnetic signals or pulses. The instrument package includes a power source that applies a voltage across an insulated gap, thereby generating an electromagnetic field. The gap is typically a few thousandths of an inch wide and may be formed, for example, by providing an insulated coating on the treads of a connection between two sections of the drill string. The EM pulses are transmitted through the resistive soil surrounding the drilling equipment and received by a receiver on the surface.

Since the EM configuration, like mud pulse telemetry, does not require a wired connection between the instrument package and the receiver through the drill string, it avoids many of the problems associated with the wire-line configuration. However, there are number of disadvantages associated with the EM configuration.

For example, because the battery power source used to power the generation of the EM pulses is located in the underground portion of the drilling equipment, rather than on the surface, it is not readily accessible for recharging or replacement. Moreover, the batteries for the power source add to the size and weight of the instrument package.

In addition, transmitting EM pulses through soil generally requires more power and has a much lower data rate than transmission through an electrical wire. Systems employing the EM configuration typically achieve data rates of only about 5–20 bps. This is particularly disadvantageous in view of the size and weight limitations imposed on the power source by practical considerations.

The need exists for an improved system of transmitting data from underground activities.

SUMMARY OF THE INVENTION

It is a general object of the present invention to provide a data communication system for communicating with an underground electronic device that overcomes the disadvantages of conventional wire-line and electromagnetic systems.

It is another object of the present invention to provide a data communication system that does not require a wired connection that may be entangled or severed by the drilling equipment or may be vulnerable to failure due to mechanical forces associated with the operation of the drilling equipment.

It is another object of the present invention to provide a data communication system in which the communication power supply is located on the surface rather than in the underground portion of the drilling equipment, so that it is readily accessible for recharging or replacement and does not add to the size and weight of the underground electronic device.

It is another object of the present invention to provide a data communication system having a data rate comparable to or exceeding those of conventional wire-line systems.

In accordance with the objects described above, one aspect of the present invention provides a data communication system for communicating with an underground instrument package positioned on a drilling apparatus. The drilling apparatus has an insulated section between first and second conductive sections. The data communication system includes a power supply connected to the first conductive section of the drilling apparatus and to the ground. A receiver is connected to measure current flowing through the power supply. An electrical path is provided between the first and second conductive sections of the drilling apparatus. A switch opens and closes the electrical path in response to data generated by the instrument package.

Another aspect of the present invention provides a data communication system for communicating with an underground electronic device. The data communication system includes a first conductive section, a second conductive section that is positioned underground and electrically connected to the electronic device, and an insulated section positioned between and connecting the first and second conductive sections. A power supply is connected to the first conductive section and to the ground. A receiver measures current flowing through the power supply. A switch is provided in an electrical path between the first and second conductive sections. The switch opens and closes the electrical path in response to data generated by the electronic device.

Another aspect of the present invention provides a data communication method for communicating with an underground instrument package positioned on a drilling apparatus. The drilling apparatus has an insulated section between first and second conductive sections. The data communication method includes the step of connecting a power supply to the first conductive section of the drilling apparatus and to the ground. Current flowing through the power supply is measured using a receiver. A switch provided in an electrical path between the first and second conductive sections of the drilling apparatus is opened and closed in response to data generated by the instrument package.

Aspects of the present invention may include one or more of the following features.

The switch may include a transistor, such as a field effect transistor. The switch may apply frequency shift keying modulation to the current in the electrical path.

An internal power source of the instrument package may be charged by a voltage formed between the first and second conductive sections of the drilling apparatus while the electrical path is opened by the switch.

The electrical path may include a wire running through the insulated section of the drilling apparatus. An end of the wire may be connected to the first conductive section of the drilling apparatus.

The switch may be electrically connected to a conductive housing of the instrument package, and the housing of the instrument package may be electrically connected to the second conductive section of the drilling apparatus.

The power supply may be connected to the ground through a wire inserted in the ground above the underground instrument package. The instrument package may include sensors for detecting a status of the drilling apparatus.

The data communication system also may include a control transmitter for superimposing a control signal for controlling the instrument package on the current produced by the power supply. A control receiver in the instrument package may receive the control signal and generate control data in response to the control signal. The control transmitter may employ frequency shift keying.

The instrument package may activate a low power consumption mode for the internal power source in response to a switching off of the power supply. The instrument package may activate a low power consumption mode for the internal power source in response to the control data.

BRIEF DESCRIPTION OF THE DRAWINGS

FIG. 2 is a block diagram of a section of the drill string in accordance with the present invention.

FIG. 3 is a block diagram of an instrument package in accordance with the present invention.

DETAILED DESCRIPTION

Figure 1:
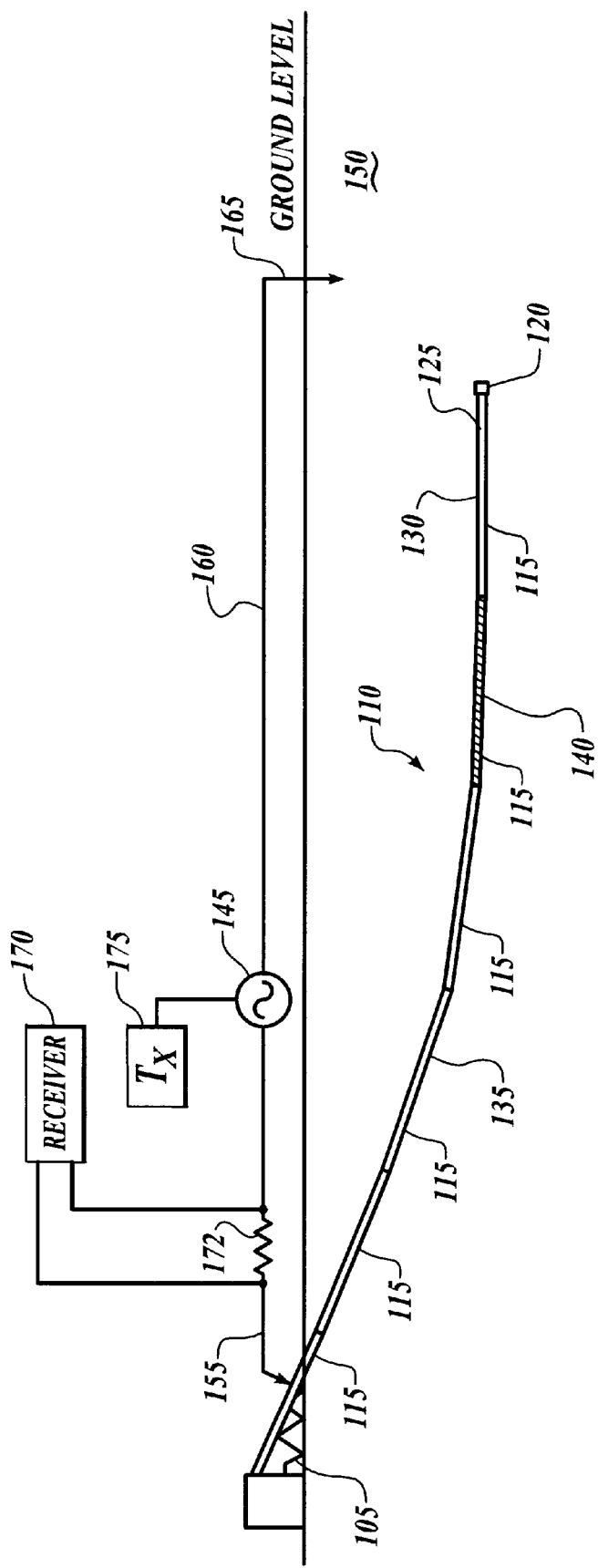
FIG. 1 is a block diagram of a drilling apparatus with a data communication system in accordance with the present invention.

As shown in FIG. 1, in accordance with the present invention, a drilling rig 105 performs underground drilling with a drill string 110 located in a down-hole well bore. The drill string 110 includes a series of drill pipes 115, and has a drill bit assembly 120 at its terminal end. The drill string 110 includes an instrument package 125 proximate to the drill bit 120 end.

The instrument package 125 may include a variety of electronic devices, such as sensors for detecting the position and orientation of the drill bit 120. The sensors also may detect the status and condition of the drilling equipment, e.g., the temperature of the drill bit assembly. Other types of electronic devices, such as geologic testing equipment or oil well monitoring equipment, also may be provided in the instrument package. The present invention provides data communication with the electronic devices in the instrument package while the instrument package 125 is underground.

In addition to the horizontal drilling application shown in FIG. 1, the present invention may of course be used in other applications, such as vertical drilling. Furthermore, the present invention may be used to communicate with production well monitoring equipment, such as for oil or gas wells.

The drill string 110 can be divided into three sections for the purposes of explaining the present invention. The instrument package 125 is installed in a conductive lower section 130 of the drill string 110. The lower section 130 is separated from an upper conductive section 135 of the drill string 110 by an insulated section 140.

A surface power supply 145 is connected to the upper conductive section 135 of the drill string 110 and to ground 150. The connection between the power supply 145 and the drill string 110 may be through a wire 155. The ground connection may be made through a wire 160 that is inserted in the ground 150 at a point approximately above the underground instrument package 125, or the wire 160 may be connected to a probe 165 inserted in the ground 150. As further discussed below, while the insertion point of the probe 165 affects the received signal levels, an effective position readily may be determined during installation of the system.

The conductive sections 135 and 130 of the drill string 110 and the wires 155 and 160 connected to the surface power supply 145 form part of the communication circuit. The remainder of the communication circuit is formed by two circuit portions in which current flows through soil. The first of these circuit portions is the gap between the upper 135 and lower 130 conductive sections of the drill string 110. Current flows between these sections through the soil surrounding the insulated section 140. The other of these circuit portions is the gap between the lower conductive portion 130 of the drill string 110 and the power supply ground probe 165. Similarly, current flows between these points through the soil above the lower section 130 of the drill string 110.

The surface power supply 145 generates a current in the communication circuit. Because the power supply 145 is located on the surface, rather than in the instrument package 125, it easily may be adjusted or replaced with a different power supply depending upon the requirements of a particular installation. For example, the power supply level may be increased for an installation in which the soil is highly resistive or the instrument package is positioned deeper in the ground.

As further discussed below, the instrument package 125 transmits data to the surface by modulating the current flowing through the communication circuit. The receiver 170 measures and demodulates the current to reproduce the data, e.g., by measuring the voltage across a resistor 172. Similarly, a transmitter 175 may be used to send control data to the instrument package 125 by superimposing a control signal on the current generated by the power supply 145.

FIG. 2 shows a portion of the drill string 110 including the upper conductive section 135, insulated section 140, lower conductive section 130, instrument package 125, and drill bit assembly 120. The instrument package 125 is contained in a pressurized metal housing 205 installed within the lower conductive section 130.

An electrical wire 210 extends from the instrument package 125 through the insulated section 140 and connects to the upper conductive section 135. The wire 210 may be used to short circuit the current path through the soil surrounding insulated section 140. In other words, current may be directed to flow through the wire 210, which has a relatively low resistance, or through the soil surrounding the insulated section 140, which has a relatively high resistance. For a given surface power supply voltage, directing the current through the high resistance path through the soil will result in a lower current level, while directing the current through the low resistance wire 210 will result in a higher current level. Hence, the instrument package 125 can modulate the current by alternating between these current paths.

As shown in FIG. 3, the wire 210 is connected to the control subsystem 300 of the instrument package 125. The control subsystem 300 also is connected to the metal housing 205 of the instrument package 125. The control subsystem 300 therefore can connect the wire 210 to the metal housing 205, which contacts the lower conductive section 130, thereby creating an electrical connection between the upper 135 and lower 130 conductive sections. Alternatively, the control subsystem 300 may be directly connected to the lower conductive section 135.

The instrument package 125 includes sensors 305 for measuring parameters, such as but not limited to the orientation and equipment status of the drill bit assembly 120. The output of the sensors 305 is received by a data acquisition subsystem 310, which converts the sensor 305 output into digital data and formats the data for transmission. The data to be transmitted is passed to the control subsystem 300, which modulates the current in response to the encoded data. The instrument package 125 also includes an internal power source 315 for powering the sensors 305, control subsystem 300, and data acquisition subsystem 310.

Figure 4:
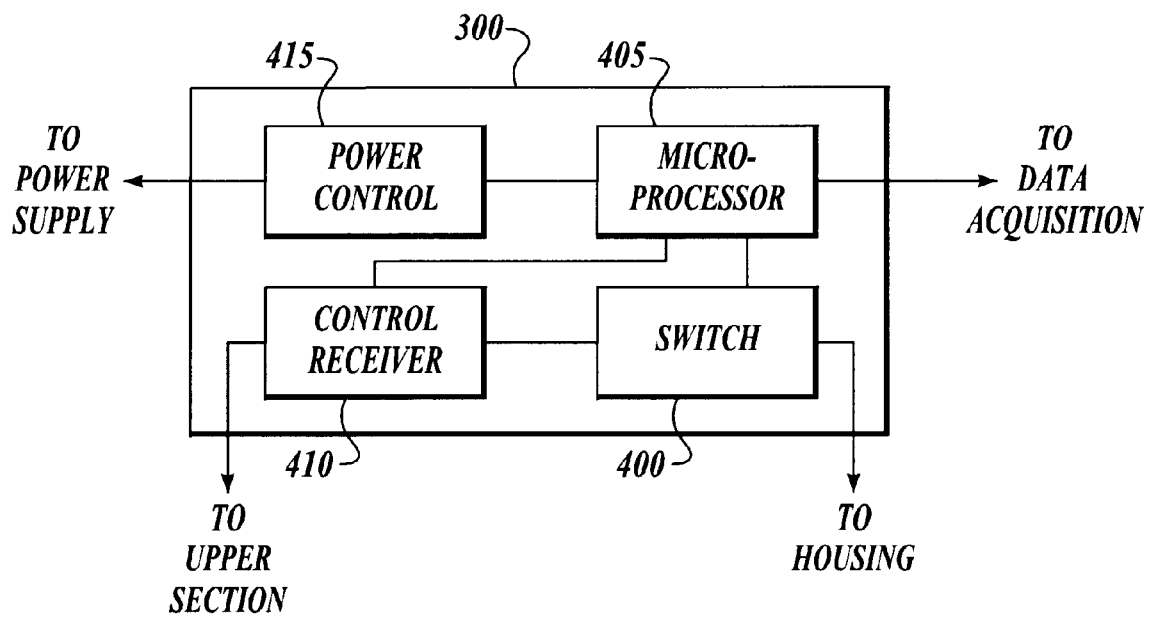
FIG. 4 is a block diagram of a control subsystem in accordance with the present invention.

FIG. 4 shows components of the control subsystem 300. A switch 400 controls the current path through the drill string 110 as described above. When the switch 400 is closed, the current flows through the wire 210 connecting the upper 135 and lower 130 conductive sections. When the switch 400 is open, the current flows between the upper 135 and lower 130 sections by passing through the soil surrounding the insulated section 140. The switch 400 may be implemented, for example, by a transistor, such as a field effect transistor (FET). Alternatively, other switching mechanisms may be used.

The switch 400 is controlled by a microprocessor 405, which receives the sensor data from the data acquisition subsystem 310. The microprocessor 405 controls the switch 400 based on the received data in accordance with a modulation technique. A number of different modulation techniques may be used, such as frequency shift keying (FSK) modulation.

For example, using FSK, the microprocessor 405 may open and close the switch 400 with a frequency of 2400 Hz to represent a logical zero and with a frequency of 4000 Hz to represent a logical one. Using this modulation technique, a data rate of about 1200 bps can be achieved, which is about 100 times faster than typical wireless EM systems.

As discussed above, a control signal may superimposed on the current flowing through the communication circuit. The control signal is detected by a control receiver 410, which outputs control data to the microprocessor 405.

The control data may be used, for example, to direct the power control 415 to switch off the internal power source 315 during periods when the sensors 305 are not needed. Alternatively, the power control 415 may activate a low power consumption mode in which only critical components of the instrument package 125, such as the microprocessor 405, are powered. The power control 415 also may be configured to turn off the internal power source 315 automatically in response to the surface power supply 145 being turned off. In addition, while the internal power source 315 is turned off or in the lower power consumption mode, it may be trickle charged using the voltage formed across the insulated section 140. Accordingly, the life of the internal power source 315 is extended, and its size and weight may be reduced.

As described above, the instrument package 125 modulates the current in the communication circuit by switching between a high resistance current path through the soil surrounding the insulated section 140 and a low resistance wire 210 connecting the upper 135 and lower 130 conductive sections. Switching between these two paths changes the overall resistance of the communication circuit and, for a given power supply voltage, thereby changes the magnitude of the current.

The change in the magnitude of the current must be sufficiently large in order for the modulations to be detected by the receiver. Accordingly, analysis was performed to estimate the resistance of the soil surrounding the insulated section in order to determine the change in the magnitude of the current resulting from the switching operation.

In the analysis, the insulated section was assumed to be 6 meters long (20 feet). It also was assumed that the equipotential loci and the current flux contours were symmetrical about a perpendicular plane located at the mid-point of the insulated section. Due to the complexity of the exact solution for the equipotentials and flux contours, simpler functions were used to approximate these functions in order to obtain a result within an order of magnitude.

To estimate resistance through the soil surrounding the insulated section, the total voltage impressed across the insulated section may be divided by the current crossing the mid-point perpendicular plane. This current may be estimated as follows:

(1) Compute the resistance of a cylinder on the axis of symmetry at the mid-point plane. The cylinder has a radius of 0.1 m and length of 0.1 m.

$$R = \rho \frac{l}{A}$$

$$= \rho \frac{0.1}{0.01\pi}$$

$$= 3.18\rho \ \Omega$$

(2) Compute the current passing through this cylinder for a voltage v between its ends. The voltage can be estimated as the product of the gradient at the mid-point times the cylinder length.

For a uniform field, the gradient is equal to the total voltage V divided by the length of the insulated section. However, the upper and lower conductive sections form thin electrodes at each end of the insulated section, resulting in a large gradient at the ends of the insulated section and a minimum gradient at the mid-point. The mid-point voltage gradient will be between approximately 0.2 and 0.5 times the uniform gradient. Therefore, in computing the current density, the voltage gradient will be estimated to be 0.5V divided by 6.0 m, which equals 0.083 V/m.

The current (I) and centerline current density ($J_0$) are given by:

$$I = \frac{0.083V \times 0.1}{3.18\rho}$$

$$= 0.0026 \frac{V}{\rho} \ \text{Amps}$$

$$J_0 = \frac{0.0026V}{(0.1\pi)\rho}$$

$$= 0.083 \frac{V}{\rho} \ \text{Amps/m}^2$$

(3) The centerline current density decays smoothly with increasing radius. The total mid-plane current may be approximated by assuming that the current density remains at its centerline value out to a radius of 1.5 meters (a cylinder of radius ⅓ of the section length) and then decays exponentially with an electric field folding length of 1.5 m. These assumptions yield the following expression for current density:

$$J = J_0 \quad \quad 0 \leq r \leq 1.5$$

$$= J_0 e^{-\frac{(r-1.5)}{1.5}} \quad r > 1.5$$

(4) Compute the total current as the integral of the current density times the mid-plane area extending from the centerline to an infinite radius:

$$I_t = J_0 \left[ 2.25\pi + \int_{1.5}^{\infty} 2\pi r e^{-\frac{(r-1.5)}{1.5}} dr \right]$$

$$= J_0 \left[ 7.07 + 2\pi(2.25) \int_0^{\infty} (x+1)e^{-x} dx \right]$$

$$= J_0 [7.07 + 14.14(\Gamma(2) + \Gamma(1))]$$

$$= J_0 [7.07 + 14.14(1+1)]$$

$$= 35.4 J_0 \ \text{Amps}$$

(5) Divide the total voltage V by the total current $I_t$ to obtain the apparent resistance:

$$R = \frac{V}{35.4 J_0}$$

$$= \frac{V\rho}{35.4 \times 0.083 V}$$

$$= 0.34\rho \ \Omega$$

Figure 5:
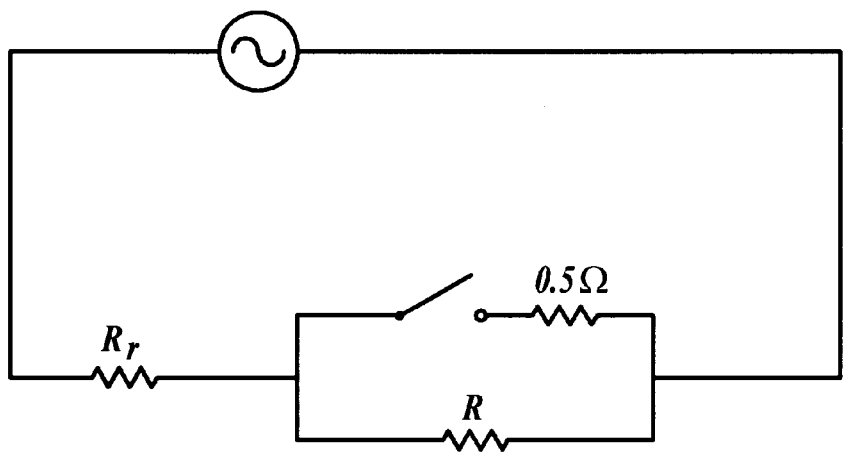
FIG. 5 is a circuit diagram of the communication circuit in accordance with the present invention.

(6) As shown in FIG. 5, to determine the current variation when the insulated section is short circuited, it may be assumed that the switching circuitry and wire have a resistance of 0.5 Ohms, which is in parallel with the computed apparent resistance of the insulated section, R. The remainder of the circuit, i.e., the conductive sections of the drill string, the power supply wires, and the soil path between the lower conductive section and the power supply ground connection, may be assumed to have a resistance $R_r$.

The total resistance of the circuit, $R_t$, may be computed as a function of the resistance of the remainder of the circuit, $R_r$, for the shorted (switch closed) and unshorted (switch open) condition. This calculation was performed for several values formation resistivity, $\rho$, as shown in the following table. The ratio of the shorted and unshorted total resistance may be used to determine the change in current magnitude.

| Formation Resistivity | $R_t$ Unshorted | $R_t$ Shorted | Ratio |
|---|---|---|---|
| 0.1 | 0.068 | 0.066 | 1.03 |
| 0.2 | 0.136 | 0.128 | 1.06 |
| 0.5 | 0.34 | 0.297 | 1.14 |
| 1.0 | 0.68 | 0.542 | 1.25 |
| 2.0 | 1.36 | 0.968 | 1.40 |
| 5.0 | 3.40 | 2.086 | 1.63 |
| 10.0 | 6.80 | 3.836 | 1.77 |
| 20.0 | 13.6 | 7.266 | 1.87 |
| 50.0 | 34.0 | 17.485 | 1.94 |
| 100.0 | 68.0 | 34.492 | 1.97 |

For formation resistivities greater than 1.0 Ohm-meters, the current magnitude changes by 25% or more when the insulated section is shorted. Even at a formation resistivity as low as 0.1 ohm meters provides a current change of 3%, which corresponds to a change of 30 mA for a total current of 1 A. Such a change in magnitude is readily detectable by the receiver.

Figure 6:
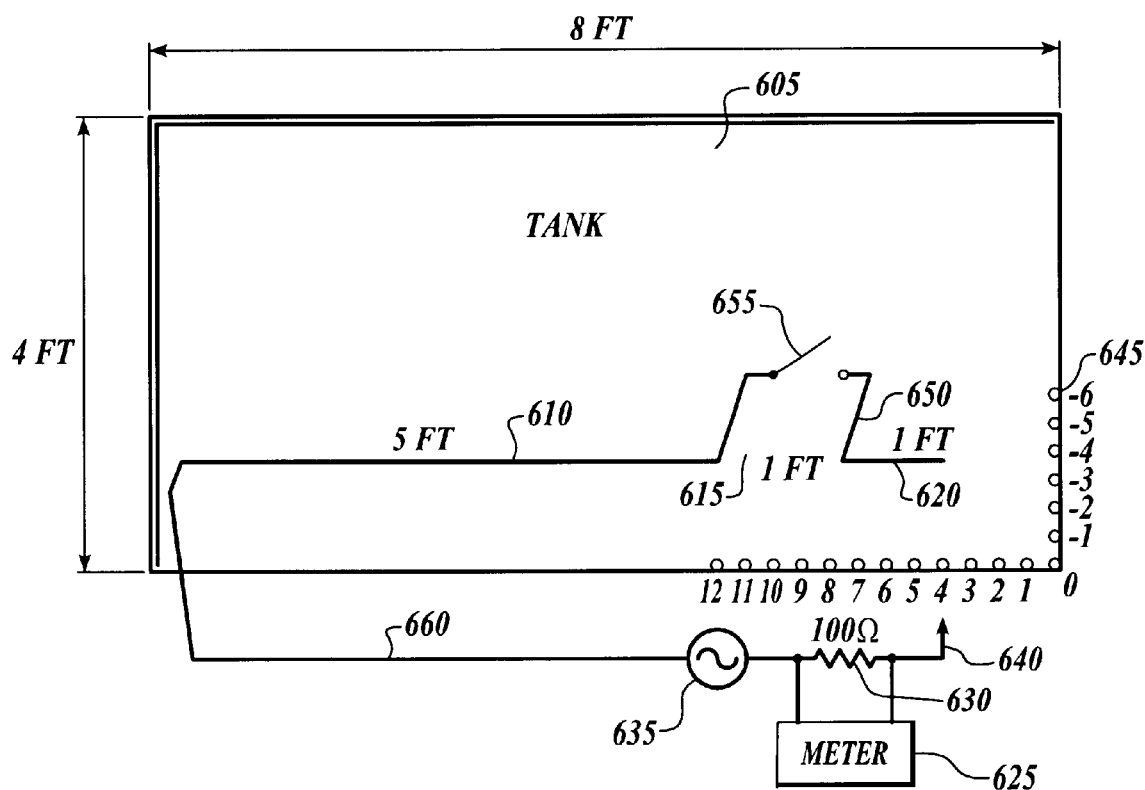
FIG. 6 is a block diagram of a communication system test apparatus.

In addition to the analysis described above, testing was performed using the test apparatus shown in FIG. 6. To simulate transmission of electrical signals through soil, the test apparatus included a water tank 605 measuring 4 feet by 8 feet which contained about 2 inches of water with 500 ppm NaCl added. The drill string was simulated by a ¼ inch by ¼ inch stainless steel rod, which was configured as follows. The upper conductive section was simulated by a 5 foot length of the rod 610, the insulated section was simulated by a 1 foot gap 615, and the lower conductive section was simulated by an additional 1 foot length of the rod 620.

A voltmeter 625 connected across a 100 Ohm resistor 630 was used to represent the receiver and measure the current through the circuit. A power supply 635 was connected in series with the resistor 630 and was connected to the 5 foot section 610 of the rod with #18 magnet wire 660. A probe 640 representing the power supply ground connection was connected to the other end of the resistor 630. The probe 640 was applied to a series of measurement locations 645 on the water tank 605 with a 3 inch spacing, thereby completing the measurement circuit.

Insulated wires 650 and a switch 655 were connected between the 5 foot section 610 and the 1 foot section 620 to represent the electrical path used to short circuit the insulated section of the drill string. The voltage across the resistor 630 was measured while the switch 655 was opened and closed at each of the measurement locations 645.

The following table shows the voltage measured across the 100 Ohm resistor at each measurement location for the open and closed switch positions using a 5 Volt DC source.

| Location | Switch Closed (V DC) | Switch Open (V DC) | ΔV (V DC) |
|---|---|---|---|
| 0 | 1.1147 | 0.8562 | 0.258 |
| 1 | 1.1634 | 0.8902 | 0.273 |
| 2 | 1.2873 | 0.9616 | 0.326 |
| 3 | 1.3742 | 1.0107 | 0.363 |
| 4 | 1.4402 | 1.0560 | 0.384 |
| 5 | 1.4970 | 1.1032 | 0.394 |
| 6 | 1.5243 | 1.1485 | 0.376 |
| 7 | 1.5365 | 1.1990 | 0.338 |
| 8 | 1.5395 | 1.2512 | 0.288 |
| 9 | 1.5435 | 1.3099 | 0.237 |
| 10 | 1.5440 | 1.3647 | 0.179 |
| 11 | 1.5462 | 1.4245 | 0.128 |
| 12 | 1.5520 | 1.4723 | 0.080 |
| -1 | 1.1573 | 0.8671 | 0.290 |
| -2 | 1.2702 | 0.9446 | 0.326 |
| -3 | 1.3544 | 0.9872 | 0.367 |
| -4 | 1.3827 | 1.0066 | 0.376 |
| -5 | 1.3882 | 1.0220 | 0.366 |
| -6 | 1.3624 | 1.0265 | 0.336 |

The following table shows the voltage measured across the 100 Ohm resistor for an AC power supply set to 4.781 VAC, 100 Hz. Three sets of measurements (for the switch opened and closed) were made at each location.

| Loc. | Closed (V AC) | Open (V AC) | Closed (V AC) | Open (V AC) | Closed (V AC) | Open (V AC) |
|---|---|---|---|---|---|---|
| 0 | 1.3278 | 1.0918 | 1.3115 | 1.0797 | 1.3215 | 1.0867 |
| 1 | 1.3485 | 1.1056 | 1.3704 | 1.1194 | 1.3708 | 1.1197 |
| 2 | 1.4894 | 1.1947 | 1.4832 | 1.1929 | 1.4805 | 1.1912 |
| 3 | 1.5678 | 1.2483 | 1.5706 | 1.2497 | 1.5664 | 1.2469 |
| 4 | 1.6370 | 1.2964 | 1.6402 | 1.2980 | 1.6410 | 1.2980 |
| 5 | 1.6942 | 1.3440 | 1.6978 | 1.3473 | 1.6944 | 1.3451 |
| 6 | 1.7245 | 1.3850 | 1.7317 | 1.3920 | 1.7274 | 1.3874 |
| 7 | 1.7437 | 1.4368 | 1.7441 | 1.4377 | 1.7440 | 1.4362 |
| 8 | 1.7517 | 1.4941 | 1.7449 | 1.4895 | 1.7455 | 1.4886 |
| 9 | 1.7509 | 1.5473 | 1.7506 | 1.5488 | 1.7505 | 1.5470 |
| 10 | 1.7534 | 1.6033 | 1.7512 | 1.6081 | 1.7527 | 1.6095 |
| 11 | 1.7656 | 1.6630 | 1.7630 | 1.6633 | 1.7615 | 1.6642 |
| 12 | 1.7693 | 1.7125 | 1.7704 | 1.7139 | 1.7708 | 1.7157 |
| -1 | 1.3810 | 1.1257 | 1.3702 | 1.1187 | 1.3746 | 1.1227 |
| -2 | 1.4782 | 1.1913 | 1.4853 | 1.1957 | 1.4832 | 1.1945 |
| -3 | 1.5509 | 1.2408 | 1.5510 | 1.2403 | 1.5512 | 1.2413 |
| -4 | 1.5853 | 1.2690 | 1.5852 | 1.2695 | 1.5850 | 1.2692 |
| -5 | 1.5865 | 1.2820 | 1.5879 | 1.2824 | 1.5894 | 1.2838 |
| -6 | 1.5615 | 1.2827 | 1.5645 | 1.2836 | 1.5660 | 1.2849 |

The following table shows the voltage measured across the 100 Ohm resistor for an AC power supply set to 4.789 VAC, 300 Hz.

| Location | Closed (V AC) | Open (V AC) | ΔV |
|---|---|---|---|
| 0 | 1.3437 | 1.1052 | 0.238 |
| 1 | 1.3853 | 1.1327 | |
| 2 | 1.5015 | 1.2083 | |
| 3 | 1.5886 | 1.2644 | |
| 4 | 1.6612 | 1.3150 | |
| 5 | 1.7184 | 1.3638 | |
| 6 | 1.7481 | 1.4066 | |
| 7 | 1.7637 | 1.4563 | 0.307 |
| 8 | 1.7687 | 1.5098 | |
| 9 | 1.7676 | 1.5660 | |
| 10 | 1.7712 | 1.6248 | |
| 11 | 1.7780 | 1.6802 | |
| 12 | 1.7838 | 1.7295 | |
| -1 | 1.4027 | 1.1454 | |
| -2 | 1.5036 | 1.2110 | |
| -3 | 1.5746 | 1.2603 | |
| -4 | 1.6065 | 1.2877 | |
| -5 | 1.6112 | 1.3019 | |
| -6 | 1.5840 | 1.3010 | |

The following table shows the voltage measured across the 100 ohm resistor for an AC power supply set to 4.792 VAC, 1 kHz.

| Location | Closed (V AC) | Open (V AC) | ΔV |
|---|---|---|---|
| 0 | 1.3657 | 1.1275 | .186 |
| 1 | 1.4002 | 1.1501 | |
| 2 | 1.5270 | 1.2325 | |
| 3 | 1.6133 | 1.2877 | |
| 4 | 1.6824 | 1.3348 | |
| 5 | 1.7380 | 1.3821 | |
| 6 | 1.7681 | 1.4246 | |
| 7 | 1.7815 | 1.4698 | .312 |
| 8 | 1.7840 | 1.5243 | |
| 9 | 1.7852 | 1.5798 | |
| 10 | 1.7883 | 1.6402 | |
| 11 | 1.7954 | 1.6975 | |
| 12 | 1.8014 | 1.7456 | |
| -1 | 1.4287 | 1.1698 | |
| -2 | 1.5316 | 1.2369 | |
| -3 | 1.5982 | 1.2820 | |
| -4 | 1.6274 | 1.3078 | |
| -5 | 1.6280 | 1.3213 | |
| -6 | 1.6051 | 1.3208 | |

The following table shows the voltage measured across the 100 Ohm resistor for an AC power supply set to 4.788 VAC, 3 kHz.

| Location | Closed (V AC) | Open (V AC) | ΔV |
|---|---|---|---|
| 0 | 1.4091 | 1.1702 | .239 |
| 1 | 1.4375 | 1.1884 | |
| 2 | 1.5487 | 1.2602 | |
| 3 | 1.6420 | 1.3193 | |
| 4 | 1.7076 | 1.3630 | |
| 5 | 1.7627 | 1.4094 | |
| 6 | 1.7902 | 1.4489 | |
| 7 | 1.8054 | 1.4973 | .308 |
| 8 | 1.8072 | 1.5487 | |
| 9 | 1.8075 | 1.6027 | |
| 10 | 1.8066 | 1.6598 | |
| 11 | 1.8155 | 1.7204 | |
| 12 | 1.8272 | 1.7712 | |

-continued

| Location | Closed (V AC) | Open (V AC) | ΔV |
|---|---|---|---|
| −1 | 1.4564 | 1.2013 | |
| −2 | 1.5586 | 1.2678 | |
| −3 | 1.6263 | 1.3135 | |
| −4 | 1.6562 | 1.3389 | |
| −5 | 1.6580 | 1.3520 | |
| −6 | 1.6335 | 1.3506 | |

The following table shows the voltage measured across the 100 Ohm resistor for an AC power supply set to 4.779 VAC, 10 kHz.

| Location | Closed (V AC) | Open (V AC) | ΔV |
|---|---|---|---|
| 0 | 1.4478 | 1.2190 | .229 |
| 1 | 1.4847 | 1.2427 | |
| 2 | 1.5965 | 1.3132 | |
| 3 | 1.6830 | 1.3670 | |
| 4 | 1.7427 | 1.4065 | |
| 5 | 1.7962 | 1.4502 | |
| 6 | 1.8246 | 1.4891 | |
| 7 | 1.8351 | 1.5314 | .303 |
| 8 | 1.8375 | 1.5815 | |
| 9 | 1.8366 | 1.6356 | |
| 10 | 1.8375 | 1.6912 | |
| 11 | 1.8431 | 1.7478 | |
| 12 | 1.8498 | 1.7928 | |
| −1 | 1.5042 | 1.2563 | |
| −2 | 1.6013 | 1.3172 | |
| −3 | 1.6627 | 1.3580 | |
| −4 | 1.6924 | 1.3827 | |
| −5 | 1.6942 | 1.3940 | |
| −6 | 1.6684 | 1.3930 | |

As the data indicates, the differential voltage is not unduly sensitive to measurement location. Hence, the measurement probe 640, which corresponds to the power supply ground probe 165 (FIG. 1), need not necessarily be positioned at the point directly above the instrument package 125. The ground connection may be repositioned as necessary in order to improve the measured signal level. It was also found that a larger surface area for the probe 165 yielded an increased signal level.

In further testing, a steering tool (i.e., an instrument package) and a steering tool receiver were connected to the test apparatus. An FET was used as the switch and was controlled by a frequency shift keying (FSK) modulated signal produced by the steering tool. The receiver successfully detected the data with performance comparable to a wire-line communication system.

Although specific embodiments of the present invention have been described above in detail, it will be understood that this description is merely for purposes of illustration. Various modifications of and equivalent structures corresponding to the disclosed aspects of the preferred embodiments, in addition to those described above, may be made by those skilled in the art without departing from the spirit of the present invention which is defined in the following claims, the scope of which is to be accorded the broadest interpretation so as to encompass such modifications and equivalent structures.

What is claimed is:

1. A data communication system for communicating with an underground instrument package positioned on a drilling apparatus, the drilling apparatus having an insulated section between first and second conductive sections, the data communication system comprising:
   a surface power supply connected to the first conductive section of the drilling apparatus and to the ground;
   a receiver connected to measure current flowing through said surface power supply;
   an electrical path between the first and second conductive sections of the drilling apparatus; and
   a switch provided in said electrical path that opens and closes said electrical path in response to the data generated by the instrument package.

2. The data communication system of claim 1, wherein said switch applies frequency shift keying modulation to the current in said electrical path.

3. The data communication system of claim 1, wherein said switch is electrically connected to a conductive housing of the instrument package and the housing of the instrument package is electrically connected to the second conductive section of the drilling apparatus.

4. The data communication system of claim 1, wherein said surface power supply is connected to the ground through a wire inserted in the ground above the underground instrument package.

5. The data communication system of claim 1, wherein the instrument package comprises sensors for detecting a status of the drilling apparatus.

6. The data communication system of claim 1, wherein said electrical path comprises a wire running through the insulated section of the drilling apparatus.

7. The data communication system of claim 6, wherein an end of said wire is connected to the first conductive section of the drilling apparatus.

8. The data communication system of claim 1, further comprising:
   a control transmitter for superimposing a control signal for controlling the instrument package on the current produced by said surface power supply; and
   a control receiver positioned in the instrument package, said control receiver being connected to receive the control signal and generate control data in response to the control signal.

9. The data communication system of claim 8, wherein said control transmitter employs frequency shift keying.

10. The data communication system of claim 8, wherein the instrument package activates a low power consumption mode for an internal power source in response to a switching off of said surface power supply.

11. The data communication system of claim 8, wherein the instrument package activates a low power consumption mode for an internal power source in response to the control data.

12. A data communication system for communicating with an underground electronic device, the data communication system comprising:
   a first conductive section;
   a second conductive section positioned underground and being electronically connected to the electronic device;
   an insulated section positioned between and connecting said first and second conductive sections;
   a surface power supply connected to said first conductive section and to the ground;
   a receiver connected to measure current flowing through said surface power supply; and
   a switch provided in an electrical path between said first and second conductive sections, said switch being configured to open and close the electrical path in response to data generated by the electronic device.

13. The data communication system of claim 12, wherein said switch applies frequency shift keying modulation to the current in the electrical path.

14. The data communication system of claim 12, wherein said surface power supply is connected to the ground through a wire inserted in the ground above the underground instrument package.

15. A data communication system for communicating with an underground electronic device, the data communication system comprising:

a first conductive means for conducting an electrical signal;

a second conductive means for conducting an electrical signal, said second conductive means being positioned underground and being electrically connected to the electronic device;

an insulated connecting means for connecting said first and second conductive means;

a surface power supply connected to said first conductive means and to the ground;

a receiver connected to measure current flowing through said surface power supply; and a modulating means for opening and closing an electrical path between said first and second conductive means in response to data generated by the electronic device.

16. The data communication system of claim 15, wherein said modulating means applies frequency shift keying modulation to the current in the electrical path.

17. The data communication system of claim 15, wherein said surface power supply is connected to the ground through a wire inserted in the ground above the underground instrument package.

18. A data communication method for communicating with an underground instrument package positioned on a drilling apparatus, the drilling apparatus having an insulated section between first and second conductive sections, the data communication method comprising:

connecting a surface power supply to the first conductive section of the drilling apparatus and to the ground;

measuring current flowing through the surface power supply using a receiver; and opening and closing a switch provided in an electrical path between the first and second conductive sections of the drilling apparatus in response to the data generated by the instrument package.

19. The data communication method of claim 18, further comprising using the switch to apply frequency shift keying modulation to the current in the electrical path.

20. The data communication method of claim 18, further comprising:

electrically connecting the switch to a conductive housing of the instrument package; and electrically connecting the housing of the instrument package to the second conductive section of the drilling apparatus.

21. The data communication method of claim 18, further comprising connecting the surface power supply to the ground through a wire inserted in the ground above the underground instrument package.

22. The data communication method of claim 18, wherein the instrument package comprises sensors for detecting a status of the drilling apparatus.

23. The data communication method of claim 18, wherein the electrical path comprises a wire running through the insulated section of the drilling apparatus.

24. The data communication method of claim 23, wherein an end of the wire is connected to the first conductive section of the drilling apparatus.

25. The data communication method of claim 18, further comprising:

superimposing a control signal for controlling the instrument package of the current produced by the surface power supply using a control transmitter; and receiving the control signal using a control receiver positioned in the instrument package and generating control data in response to the control signal.

26. The data communication method of claim 25, wherein the control transmitter employs frequency shift keying.

27. The data communication method of claim 25, wherein the instrument package activates a low power consumption mode for an internal power source in response to a switching off of the surface power supply.

28. The data communication method of claim 25, wherein the instrument package activates a low power consumption mode for an internal power source in response to the control data.

29. A data communication system for communicating with an underground instrument package positioned on a drilling apparatus, the drilling apparatus having an insulated section between first and second conductive sections, the data communication system comprising:

a power supply connected to the first conductive section of the drilling apparatus and to the ground;

a receiver connected to measure current flowing through said power supply;

an electrical path between the first and second conductive sections of the drilling apparatus; and a switch provided in said electrical path that opens and closes said electrical path in response to the data generated by the instrument package, wherein an internal power source of the instrument package is charged by a voltage formed between the first and second conductive sections of the drilling apparatus while said electrical path is opened by said switch.

30. A data communication method for communicating with an underground instrument package positioned on a drilling apparatus, the drilling apparatus having an insulated section between first and second conductive sections, the data communication method comprising the steps of:

connecting a power supply to the first conductive section of the drilling apparatus and to the ground;

measuring current flowing through the power using a receiver;

opening and closing a switch provided in an electrical path between the first and second conductive sections of the drilling apparatus in response to the data generated by the instrument package; and charging an internal power source of the instrument package by a voltage formed between the first and second conductive sections of the drilling apparatus while the electrical path is opened by said switch.

* * * * *